(12) United States Patent
Martínez De Castañeda et al.

(10) Patent No.: US 9,869,300 B2
(45) Date of Patent: Jan. 16, 2018

(54) FOUNDATION FOR WIND TURBINE TOWER AND PRE-ASSEMBLY METHOD OF WIND TURBINE TOWER

(71) Applicant: PACADAR S.A.U., Madrid (ES)

(72) Inventors: Francisco Javier Martínez De Castañeda, Majadahonda (ES); Manuel Cidoncha Escobar, Madrid (ES)

(73) Assignee: PACADAR S.A.U., Madrid (ES)

( * ) Notice: Subject to any disclaimer, the term of this patent is extended or adjusted under 35 U.S.C. 154(b) by 0 days.

(21) Appl. No.: 15/111,751

(22) PCT Filed: Jan. 16, 2014

(86) PCT No.: PCT/ES2014/070021
§ 371 (c)(1),
(2) Date: Jul. 14, 2016

(87) PCT Pub. No.: WO2015/107232
PCT Pub. Date: Jul. 23, 2015

(65) Prior Publication Data
US 2016/0333862 A1    Nov. 17, 2016

(51) Int. Cl.
*E02D 27/00* (2006.01)
*F03D 13/20* (2016.01)
*E02D 27/42* (2006.01)
*F03D 13/10* (2016.01)
*E04H 12/12* (2006.01)
*E04H 12/34* (2006.01)

(52) U.S. Cl.
CPC ............. *F03D 13/22* (2016.05); *E02D 27/42* (2013.01); *E02D 27/425* (2013.01); *E04H 12/12* (2013.01); *E04H 12/342* (2013.01); *F03D 13/10* (2016.05)

(58) Field of Classification Search
CPC ....... E02D 27/42; E02D 27/425; E02D 27/12; E02D 7/00; F03D 13/22; F03D 13/10; E04H 12/12; E04H 12/342
USPC ................. 52/294–295, 223.4; 405/232–233
See application file for complete search history.

(56) References Cited

U.S. PATENT DOCUMENTS

| | | | |
|---|---|---|---|
| 8,261,502 B2* | 9/2012 | Andersen | E02D 27/42 52/296 |
| 8,695,297 B2* | 4/2014 | Knisel | F03D 13/22 52/223.2 |
| 2004/0131428 A1 | 7/2004 | Henderson | |

(Continued)

OTHER PUBLICATIONS

International Search Report, dated Sep. 11, 2014, priority document.

*Primary Examiner* — Beth Stephan
(74) *Attorney, Agent, or Firm* — Greer, Burns & Crain Ltd.

(57) ABSTRACT

A foundation for wind turbine tower and a pre-assembly method for the tower, in which the tower comprises sections divided into shell segments, and where the foundation comprises a pile cap with an upper base, a lower base and a slanted surface, with the upper base having a smaller area than the lower base. The foundation comprises a set of support elements that extend above the slanted surface of the pile cap arranged so that free upper surfaces of these support elements provide a support surface for the shell segments for the pre-assembly of a section, and a set of slender connection elements that are connected to the pile cap and whose open end is configured connect to the shell segments of a section.

15 Claims, 5 Drawing Sheets

(56) References Cited

U.S. PATENT DOCUMENTS

| | | | |
|---|---|---|---|
| 2007/0181767 A1* | 8/2007 | Wobben | E02D 27/42 248/346.01 |
| 2007/0251187 A1* | 11/2007 | Schiffer | E02D 27/42 52/741.14 |
| 2008/0072511 A1* | 3/2008 | Phuly | E02D 27/42 52/294 |
| 2008/0302038 A1* | 12/2008 | Wobben | E02D 27/42 52/296 |
| 2010/0095617 A1* | 4/2010 | Scholte-Wassink | F03D 13/22 52/296 |
| 2011/0061321 A1* | 3/2011 | Phuly | E02D 27/42 52/297 |
| 2012/0047830 A1* | 3/2012 | Phuly | E02D 27/42 52/294 |
| 2012/0070233 A1 | 3/2012 | Wang et al. | |
| 2012/0266552 A1* | 10/2012 | Huynh Tong | E04H 12/16 52/223.4 |
| 2014/0250806 A1* | 9/2014 | Schibsbye | E02D 27/42 52/223.13 |
| 2015/0225918 A1* | 8/2015 | Phuly | E02D 27/42 52/297 |

* cited by examiner

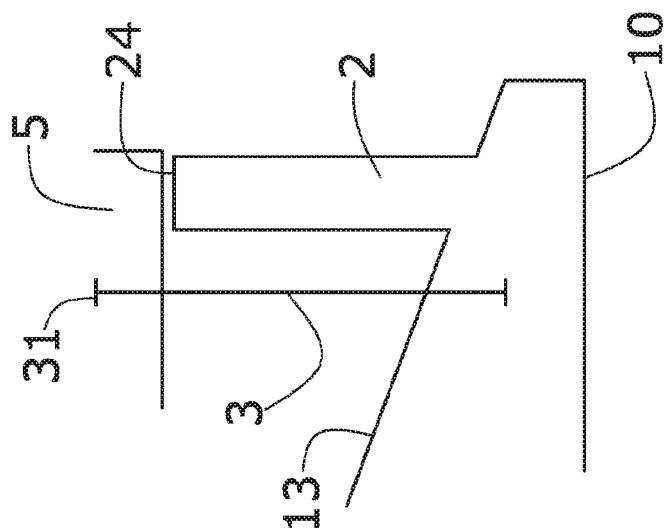
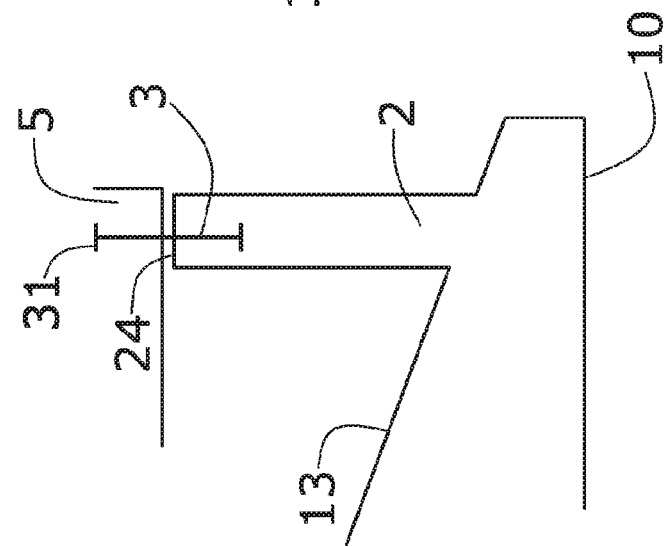
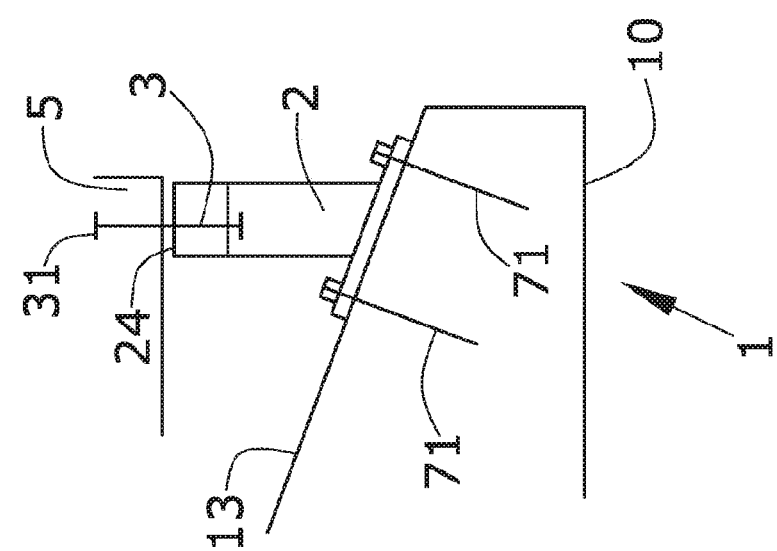

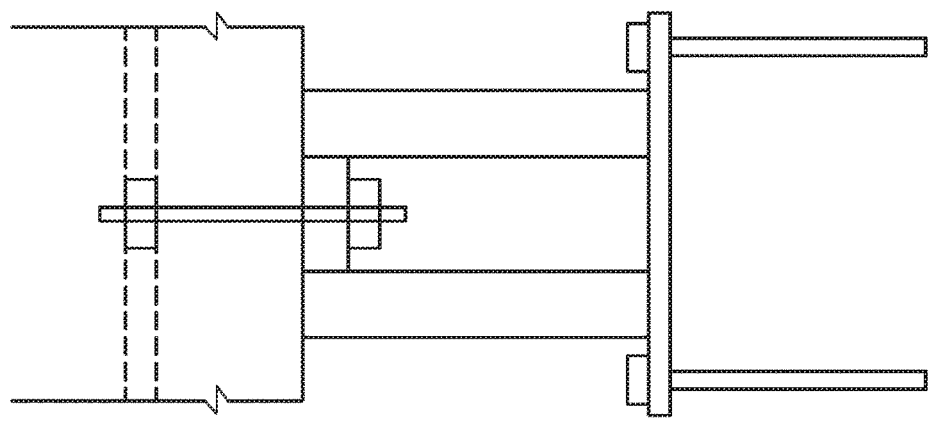
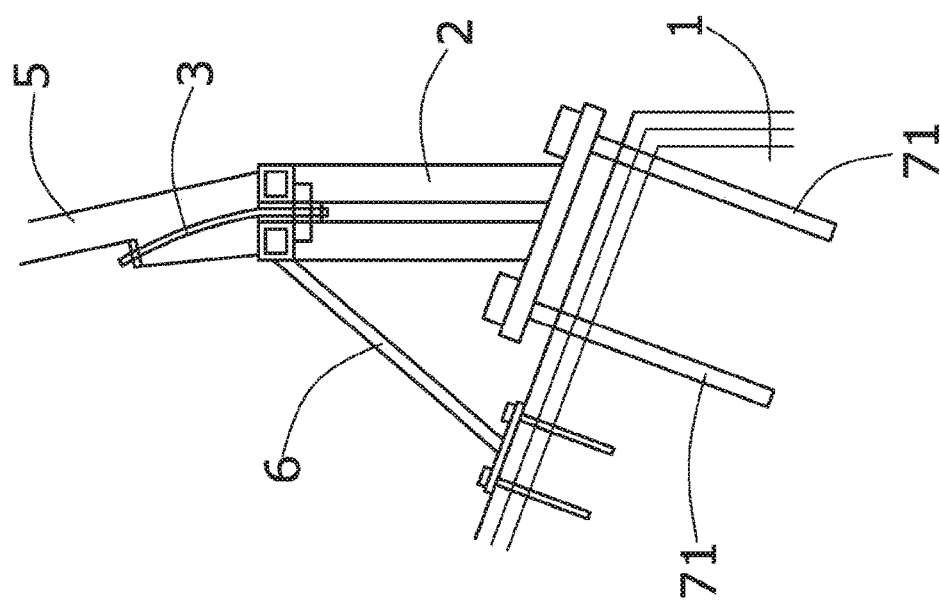
FIG.4

FOUNDATION FOR WIND TURBINE TOWER AND PRE-ASSEMBLY METHOD OF WIND TURBINE TOWER

FIELD OF THE INVENTION

The invention describes a foundation and the pre-assembly method of a wind turbine tower, in which the base for the pre-assembly is installed on the tower foundation.

BACKGROUND OF THE INVENTION

The concrete towers for wind turbines can be divided into sections, which are hollow segments that can in turn be divided into sectors or shell segments, to allow the sectors or shell segments to be transported by road on wheeled vehicles. The sections are pre-assembled near the final tower location by joining the shell segments that make up the section in a phase called pre-assembly. The pre-assembled sections are then hoisted by a crane and stacked on top of each other to form the tower.

Pre-assembly is normally done on assembly bases, on which the shell segments are arranged vertically until the section has been completed. Pre-assembly of sections, among other disadvantages, requires a horizontal ground on which to carry out the process, also, due to the size of the shell segments, wind acts on the surface, which complicates assembly and subjects the pre-assembly base to high compression and/or tensile stresses. Another disadvantage is that the shell segments can begin to resonate with the frequency of the wind.

To support the loads of the tower and nacelle, as well as the wind load, a foundation must be constructed under the tower.

Current foundation design involves structures that are joined at the top to the bottom section of the wind turbine tower, with the lower part supported on or buried in the ground. The function of the foundation is to transmit the loads to the ground, guaranteeing stability of the tower and distributing the load on a broader ground element.

There are foundations with constant and variable thicknesses. Examples of foundations with constant thickness are those with a square or oval horizontal layout and a cross-section that remains constant throughout the element. However, foundations with variable geometry or thickness, for example with a truncated cone shape, offer the advantage of reducing the amount of material required for construction. The base with the larger diameter is normally on the bottom, and the base with the smaller diameter on the top. The disadvantage of this foundation arrangement is that the slanted side surfaces that extend between the upper and lower bases are not flat, because the side area has slanted walls. This prevents this section of the foundation from being used as a pre-assembly base for the shell segments because, as mentioned before, a horizontal surface is required.

In order to resolve this problem, the foundation can be arranged upside down, in other words, with the base with the smaller diameter on the bottom and the base with the larger diameter on the top and in contact with the bottom section of the tower, so that this surface can be used as the horizontal surface on which to pre-assemble the sections. The main disadvantage of this solution is that it requires a larger diameter footer, and also uses more steel and/or concrete to withstand the same stresses. This is because:

the behavior of the ground is worse due to the footer geometry, because the ground has less rotational resistance; since there is no earth on top of the footer, it does not have the extra weight of the ground to provide increased stability to the tower base.

SUMMARY OF THE INVENTION

The foundation that is the object of the invention and the method of pre-assembly resolve the aforementioned disadvantages.

Based on the above information, in the state of the art, the wind turbine tower is made up of sections divided into shell segments, and the foundation comprises a pile cap with a top base, bottom base, and a slanted surface, with the top base having a smaller area than the lower base, and extending the slanted surface between the upper and lower bases. In an exemplary embodiment, this pile cap could be a truncated cone with circular bases.

The foundation is characterized in that it also comprises the following elements:

A set of support elements that are connected to the pile cap and extend above the slanted surface, arranged so that the clear (free upper) surfaces of these support elements provide a support surface for the shell segments for the pre-assembly of a section;

A set of slender connection elements that are connected to the pile cap and whose open ends are intended to connect to the shell segments of a section that is pre-assembled on the support elements. These connection elements in a preferred embodiment may be cables or metal rods whose function is to join the shell segments to the foundation. Since the shell segments are rigidly attached to the foundation, they can withstand both compression and tensile stresses. This therefore makes the solution ideal for withstanding strong winds or resonance due to the generation of vortices.

This means that this foundation provides a support surface, while at the same time providing a series of connection elements, with the supports withstanding the compression stress generated by the shell segments and the connection elements, the tensile stresses.

According to the previous description, the pre-assembly method that is the object of the invention comprises the following steps:

positioning of a first shell segment on the set of support elements that are attached to the pile cap and extend above its slanted surface, arranged so that the clear (free upper) surfaces of these support elements provide a support surface for the shell segments for the pre-assembly of a section, and connection of the first shell segment to the free end of the slender connection elements that are connected to the pile cap.

These steps will be repeated with all of the shell segments until the section has been completed.

BRIEF DESCRIPTION OF THE DRAWINGS

To complete the description, and in order to provide a better understanding of the inventions, a set of drawings is provided. These drawings form an integral part of the description and illustrate preferred embodiments of the invention. The drawings include the following figures.

FIGS. 3A, 3B and 3C show a schematic drawing of three embodiments of support elements and connection elements.

FIG. 4 shows a schematic drawing of an embodiment of a support element.

DETAILED DESCRIPTION OF THE PREFERRED EMBODIMENTS

Figure 1A:
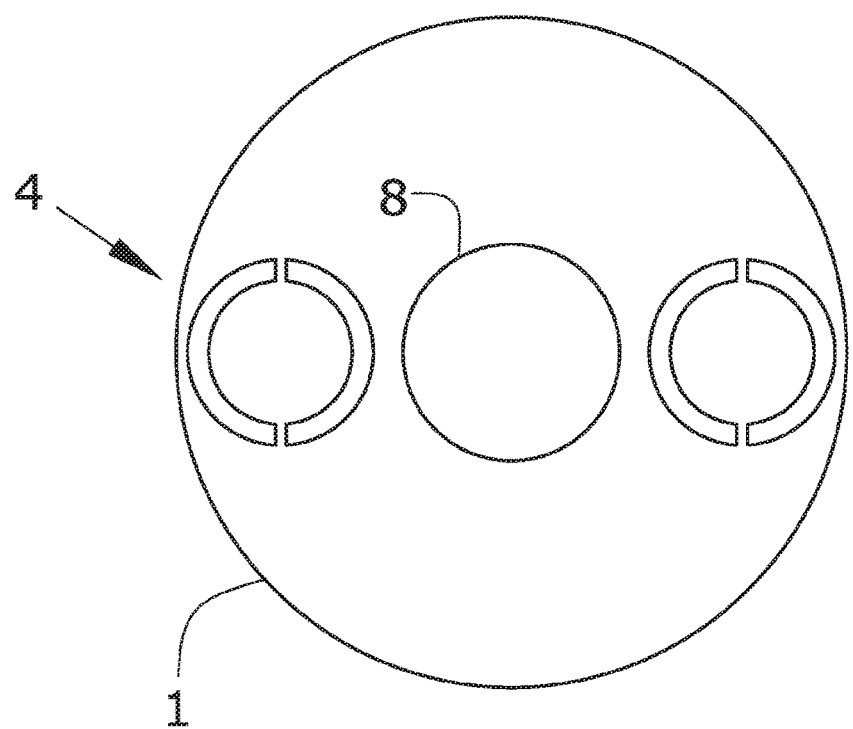
FIG. 1A provides a schematic top view of a tower foundation with a tower and the sections being pre-assembled with two shell segments.
Figure 1B:
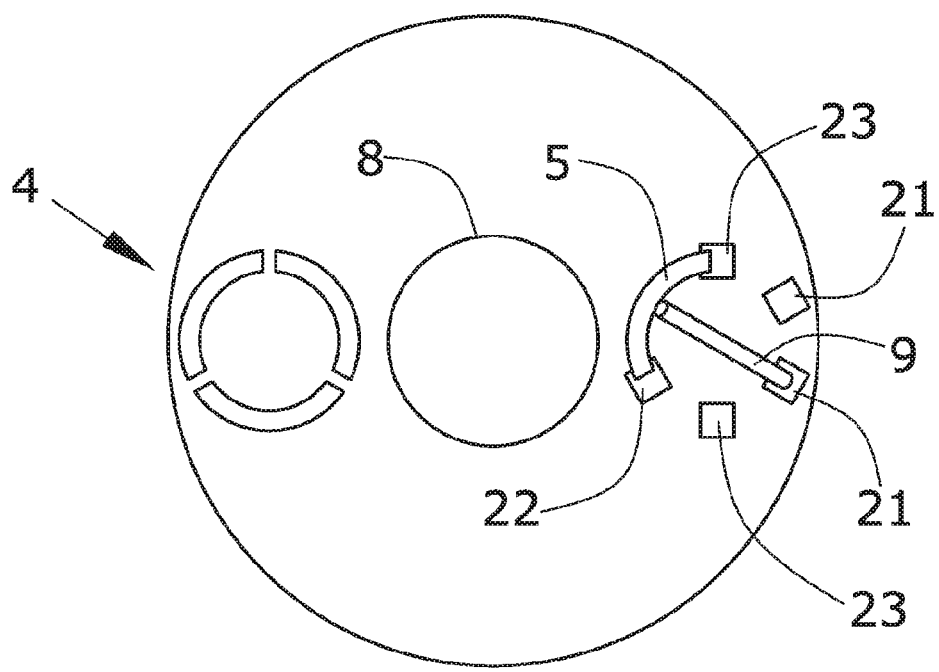
FIG. 1B provides a schematic top view of a tower foundation with a tower and the sections being pre-assembled with three shell segments.

FIGS. 1A and 1B show a top view of a foundation (8), a tower and two sections (4) that are being assembled on the foundation. More specifically, FIGS. 2A and 2B show an embodiment of a pile cap (1) with a circular upper base (12) and lower base (10), which, in combination with the slanted surface (13), form a truncated cone.

Figure 2A:
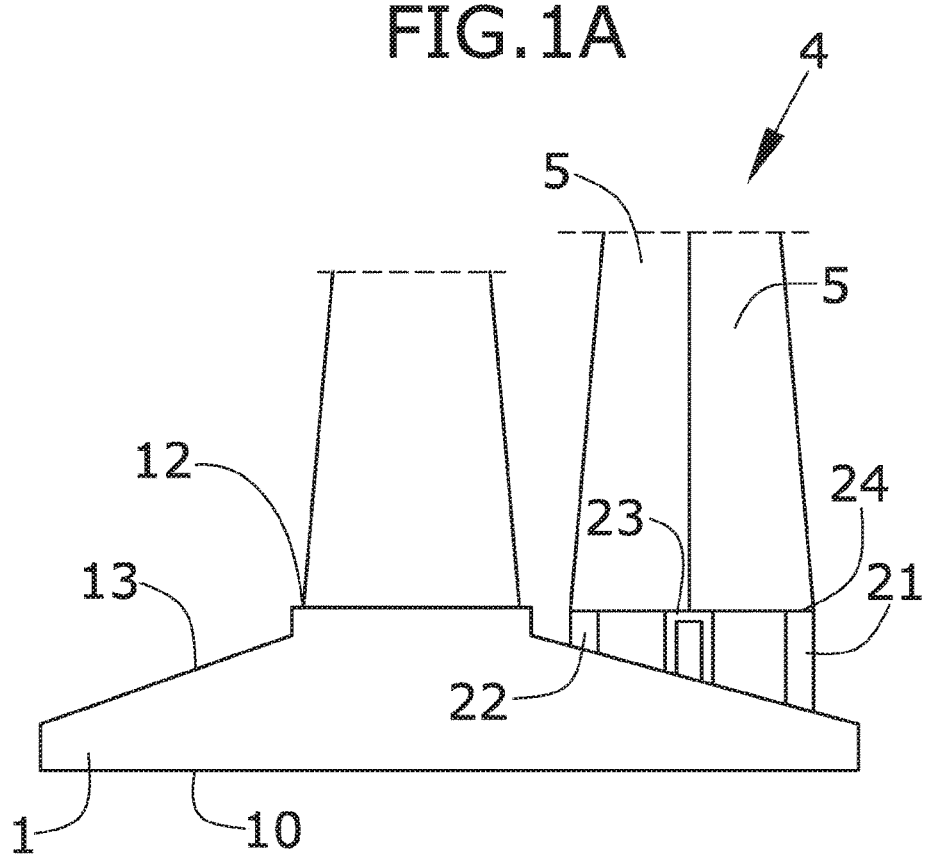
FIG. 2A provides a schematic front view of an embodiment of a foundation with a tower and a section being pre-assembled positioned on the support elements of a section with two shell segments.
Figure 2B:
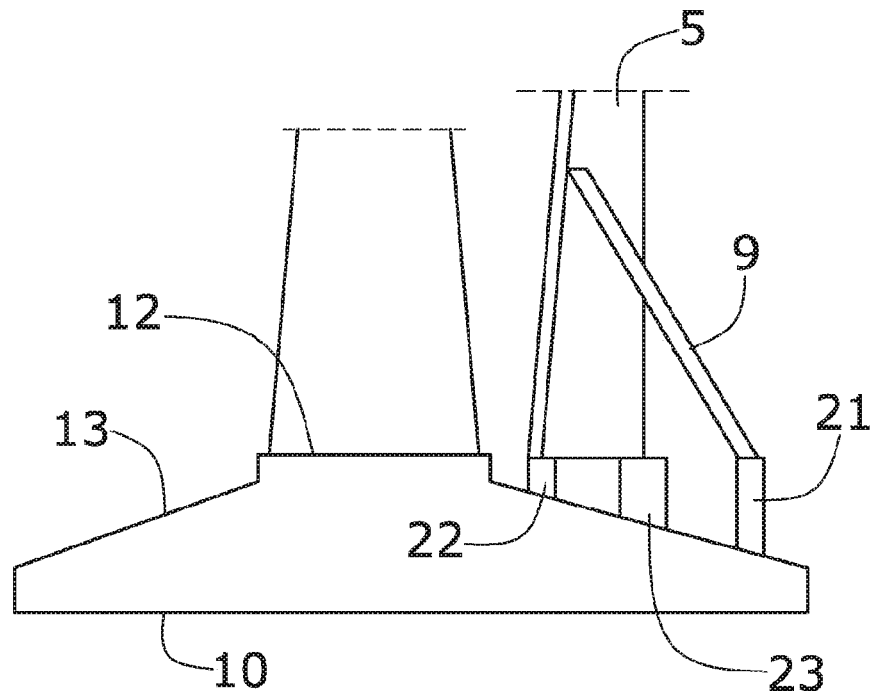
FIG. 2B provides a schematic front view of an embodiment of a foundation with a tower and a section with three shell segments being pre-assembled with a shell segment positioned on the support elements.

FIGS. 1A and 2A show an embodiment in which the section (4) has two shell segments (5), and in FIGS. 2A and 2B, the section has three shell segments (5).

FIGS. 2A and 2B also show a combination of support elements that extend above the slanted surface (13) of the pile cap (1) and that are arranged in connection to it (13). The open surfaces (24) of these support elements are arranged at the same height in order to define a series of horizontal support points for the pre-assembly of the section (4). More specifically, the set of support elements comprises several pillars (2).

In the embodiment shown in FIGS. 1A and 2A, the foundation comprises four pillars (21, 22, 23), with two pillars on the lower level (21) and upper level (22) and are designed to support the central part of the shell segments (5) of a section (4), and two other pillars located on the same level (23) for supporting each one of the ends of the shell segments (5). This means that the lower pillar (21) and upper pillar (22) support the central part of the shell segments (5), while the pillars located on the same level (23) support the ends of both shell segments (5).

In another embodiment, it would also be possible to have a number of pillars (2) that is double the number of shell segments (5), so that each shell segment (5) would be supported by two pillars, as shown in the embodiment in FIGS. 1B and 2B, where there are six pillars, two pillars are located on the lower level (21), another two on the upper level (22), and two other pillars at the intermediate level (23).

When the wind acts on the shell segment (5), the pillar (2) that supports the central part of the shell segment (5) will normally be subjected to compression, while the pillars (2) that support the ends of the shell segment (5) will be subjected to compression or tensile stress, depending on the direction of the wind. This tensile stress requires the pillars (2) to be strongly secured to the pile cap (1). For this reason, the preferred arrangement would be for the pillar (2) on the lower level (21) to support compression stress only; in other words, to support the central part of the shell segment (5), because this is the thinnest part of the pile cap (1) and therefore the anchors between the pillar (2) and the pile cap (1) will be shorter.

FIGS. 3A, 3B and 3C show three embodiments of the pillars (2) and the connection elements (3). FIGS. 3B and 3C represent several pillars (2) made out of the same material as the pile cap (1) and the form a continuous component of the pile cap (1). FIG. 3A shows a pillar (2) made of a material different from the pile cap (1) material, for example, metal, and that are connected to the pile cap (1), by connection bars (71) embedded into the pile cap (1).

Different embodiments of the slender elements (3) are also shown. A set of slender connection elements (3) are connected to the pile cap (1) and whose free ends (31) are intended to connect to the shell segments (5) of a section (4) that is pre-assembled on the support elements (2). The slender elements (3) may be metal cables or rods. These slender elements (3) may be connected to the support elements, as shown in FIGS. 3A and 3B, or directly to the pile cap (1), as shown in FIG. 3C.

FIG. 4 shows an embodiment of a metal pillar (2) connected to the pile cap (1). The pillar (2) comprises an upper support surface (24) and a connection element (3) joined to the pillar (2) at one end, and connected and tensioned to the shell segment (5) at the other. In one embodiment, the height of this pillar (2) would be 2 m.

Although the foundation defined by the invention has resistance to tensile and compression stresses as explained above, in an exemplary embodiment, this could also include at least one strut (9) to hold the shell segment (5), connected to a pillar (2) at one end, and positioned to be supported on the shell segment (5) at the other. In this case, when the section was pre-assembled, for example, the first shell segment (5) positioned on the pillars (2) would have the auxiliary support of this strut (9), as shown in FIG. 2B.

As an alternative to the struts (9), it would also be possible to install windbreaks or bracing lines, such as cables anchored to the shell segments (5) with the same function as the struts (9).

In addition, the foundation could also comprise auxiliary bracing (6), with one end anchored to the pile cap (1) and the other to a support element.

Figure 5:
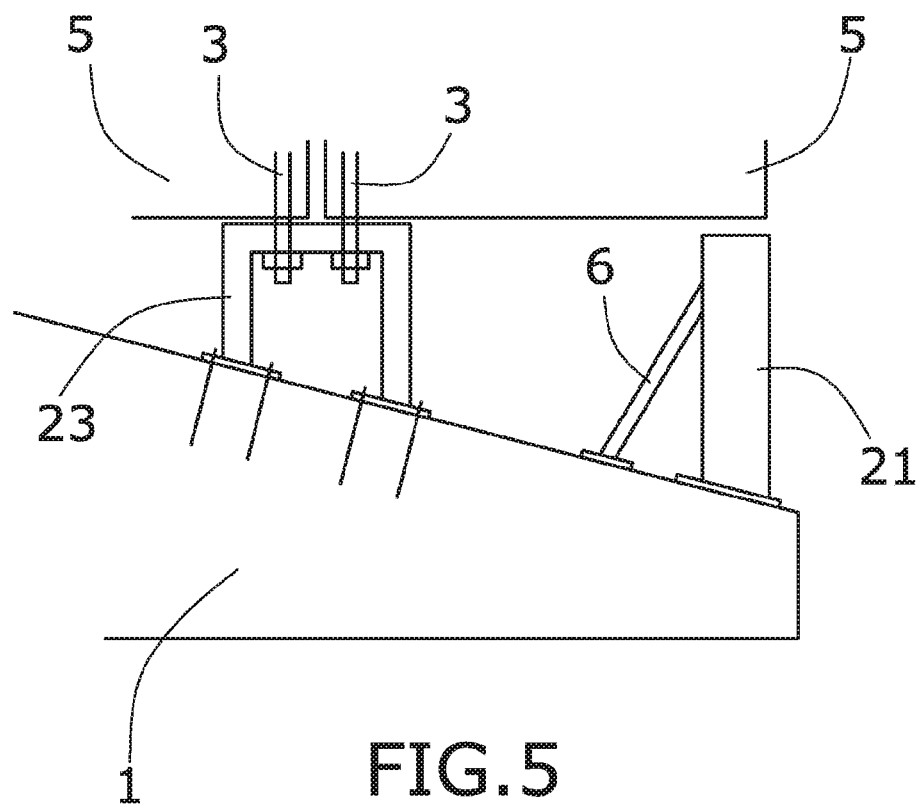
FIG. 5 shows a schematic drawing of an embodiment of a support element.

FIG. 5 shows a pillar (23) that supports two shell segments (5) that comprises two slender elements (3), each one intended for one of the shell segments (5). This pillar (23) is shared by the two shell segments (5) and when both shell segments (5) are on top of the support, the tensile stresses disappear.

Figure 6:
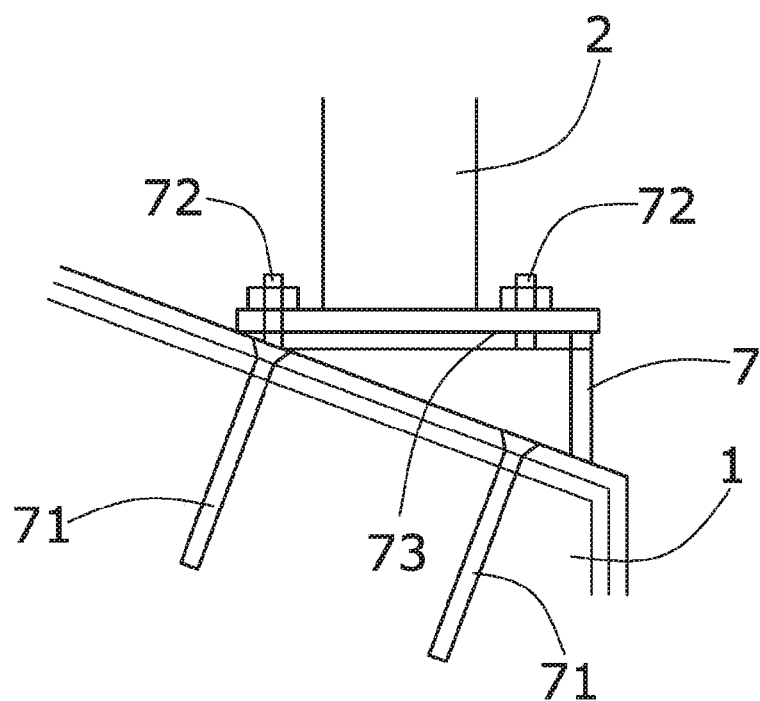
FIG. 6 shows an embodiment of a foundation.

Lastly, FIG. 6 shows an embodiment of a foundation that comprises a frame (7) located between the pile cap (1) and the support element that comprises a series of connection rods (71) embedded in the pile cap (1) and a series of anchor elements (72) for the connection to the support element (2). The frame (7) has an upper surface (73) that is essentially horizontal, for the support of the support element (2).

This means that the foundation at the site would comprise the embedded connection bars (71) in connection with the frame (7), on which the support pillars would be located, which would in turn comprise the anchor elements (72) to the shell segment (5).

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A foundation for a wind turbine tower, in which the tower comprises sections divided into shell segments, the foundation comprising:
   a pile cap with an upper base, lower base, and a slanted surface that extends between the upper base and lower base, with the upper base having a smaller area than the lower base,
   a set of support elements that extend above the slanted surface of the pile cap and in connection with the slanted surface, arranged so that free upper surfaces of these support elements provide a support surface for the shell segments for a pre-assembly of a section, and
   a set of slender connection elements that are connected to the pile cap, each connection element having a free end configured to connect to the shell segments of a section that is pre-assembled on the support elements.

2. The foundation for a wind turbine tower, according to claim 1, wherein the free upper surfaces of the support elements are arranged at a same height as each other.

3. The foundation for a wind turbine tower, according to claim 1, wherein the set of support elements comprise a series of pillars.

4. The foundation for a wind turbine tower, according to claim 3, wherein the pillars are made of the same material as the pile cap and form a continuous element with the pile cap.

5. The foundation for a wind turbine tower, according to claim 3, wherein the pillars are made of a different material than the pile cap and are secured to the pile cap.

6. The foundation for a wind turbine tower, according to claim 5, wherein the pillars are made of metal.

7. The foundation for a wind turbine tower, according to claim 1, wherein the set of slender connection elements are connected to the support elements.

8. The foundation for a wind turbine tower, according to claim 1, wherein the slender connection elements are connected to the pile cap.

9. The foundation for a wind turbine tower, according to claim 1, wherein the slender connection elements are cables or metal rods.

10. The foundation for a wind turbine tower, according to claim 1, further comprising four pillars, with a first pillar on a lower level, and a second pillar on an upper level configured to support a central part of the individual shell segments of a section, and two other pillars located on a same, intermediate level for supporting each lower end of the shell segments.

11. The foundation for a wind turbine tower, according to claim 1, further comprising double a number of pillars as shell segments, so that each shell segment is supported on the individual pillars.

12. The foundation for a wind turbine tower, according to claim 1, further comprising at least one strut to hold at least one of the shell segments, connected to a pillar at one end, and configured for supporting the at least one of the shell segments at the other.

13. The foundation for a wind turbine tower, according to claim 1, further comprising an auxiliary bracing, with one of two ends of the auxiliary bracing anchored to the pile cap and the other end to one of the support elements.

14. The foundation for a wind turbine tower, according to claim 1, further comprising a frame located between the pile cap and at least one of the support elements that comprises a series of connection rods embedded in the pile cap and a series of anchor elements for the connection to the at least one of the support elements, where the frame has an upper surface that is horizontal for the support of the at least one of the support elements.

15. A pre-assembly method of a wind turbine tower, in which the tower comprises sections divided into shell segments, and where the foundation comprises a pile cap with an upper base, lower base, and a slanted surface that extends between the upper base and lower base, with the upper base having a smaller area than the lower base, comprising the following steps:
    positioning a first shell segment on a set of support elements that extend above the slanted surface of the pile cap and are connected to the pile cap, arranged so that upper free surfaces of the support elements provide support surfaces for the shell segments for the pre-assembly of a section,
    connecting the first shell segment to free ends of the slender connection elements that are connected to the pile cap,
    repeating the aforementioned steps with all of the shell segments of the section.

* * * * *